Feb. 27, 1951 R. H. PARK 2,543,052
ELECTRIC COOKING APPARATUS
Filed Nov. 7, 1946
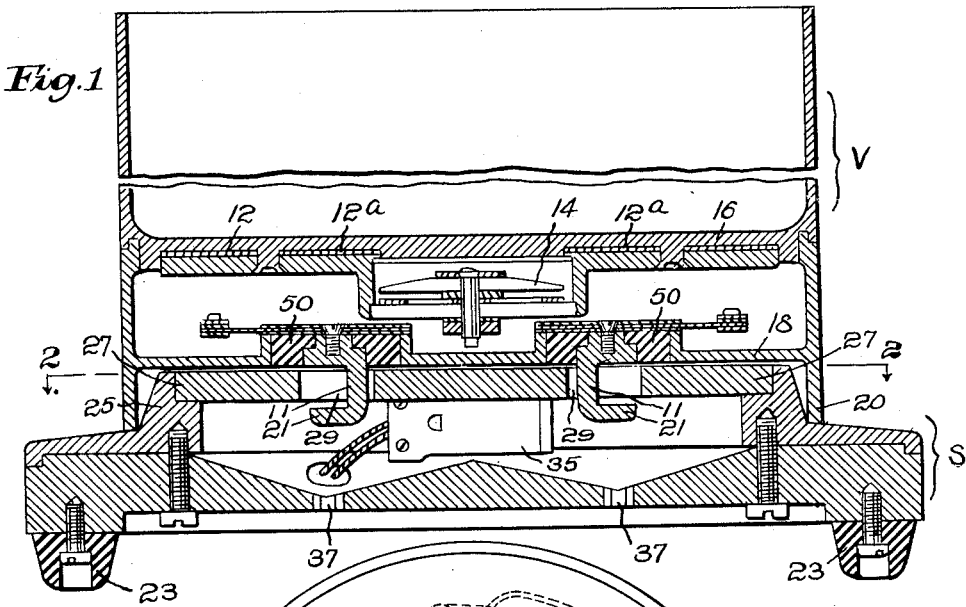
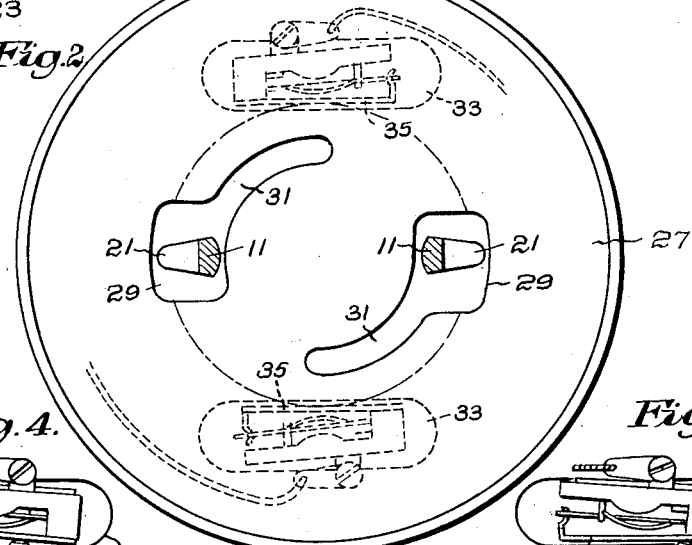
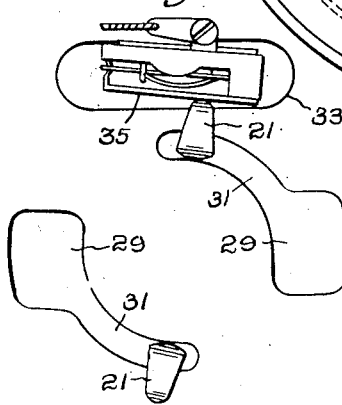
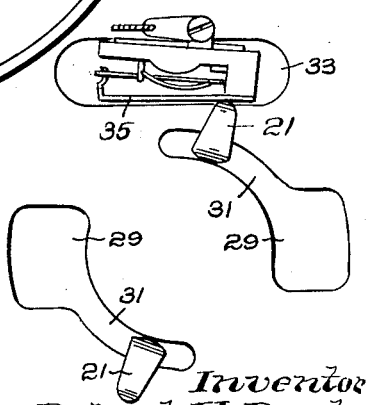
Inventor
Robert H. Park,
by Emery, Booth, Townsend, Miller & Whidden Attys Patented Feb. 27, 1951

2,543,052

UNITED STATES PATENT OFFICE 2,543,052

ELECTRIC COOKING APPARATUS

Robert H. Park, Pluckemin, N. J.

Application November 7, 1946, Serial No. 708,282

2 Claims. (Cl. 219—43)

This invention relates to electric cooking apparatus of the type disclosed in my Patents 2,012,618 and 2,233,485, embodying a portable self-contained cooking vessel provided with studs by means of which, when it is placed on a cooperating "stove" which is connected to the electrical power lines, the vessel is so connected to the source of current that the contents of the same are heated. The present improvements more particularly provide a construction of the aforesaid stove which is simple and rugged, which will keep clean and can be easily kept clean and which will be safe in use so that danger of electric shock to users and even to prying children is precluded.

My invention will be well understood by reference to the following description taken in connection with the accompanying drawing, wherein:

Fig. 1 is a central vertical section, partly broken away, through the vessel and stove in their relative positions of use and is on the horizontal diametrical line of Fig. 2;

Fig. 2 is a section on the line 2—2 of Fig. 1; and

Figs. 3 and 4 are fragmentary bottom plan views showing successive positions of parts as the electrical connection is made.

In Fig. 1 the cooking apparatus shown comprises a vessel V and the "stove" S, which latter is here illustrated as a small device comparable in size to a so-called "hot plate" but which might be a portion or unit of a relatively large or permanent installation. The vessel V here illustrated is generally of the saucepan type and like that fully described in my Patent 2,233,485. It has a double bottom. The inner bottom 16, which in use supports the contents of the vessel, has resistance elements 12 and 12a, controlled in part by a thermostat 14, supported in firm thermal conducting contact with the under side thereof. The outer bottom 18 is exteriorly uniform to permit the effective wiping traverse of a cleaning cloth or the like over the same and has openings therethrough in which are mounted massive blocks 50 of insulating material providing an impervious closure for said openings substantially flush with the bottom 18 and solid terminal studs 11 are mounted in said blocks in impermeable connection therewith and in spaced relation to the margins of the openings which receive them. Connections between the heating elements and the studs are received between the two bottoms while the studs 11 project downwardly beneath the lower bottom 18 to provide for connecting the heating elements in an electric circuit. As in the vessel disclosed in said patent, a marginal depending flange 20 may extend below the lower ends of the studs protecting the same and permitting the vessel to be set on any flat surface in a stable position. The reference numerals which are used in this paragraph are the same as those on the same parts in the patent just referred to, to which patent reference may be made for a more extended description of the particular construction of vessel herein illustrated.

The studs 11 in the present construction have at their lower ends heads 21, preferably extending radially outwardly as shown to one side only of the shanks of the studs. That is, the portions of the studs exposed beneath the bottom 18 are substantially L-shaped in elevation, as seen in Fig. 1.

The stove S comprises a housing which may be supported on feet 23 and has a circular projecting wall 25 adapted to be encircled by the flange 20 of the vessel V and which is closed by the top 27 of suitable insulating material, which top in use opposes the bottom 18 of the vessel. When the vessel is placed on the stove the studs 11 extend through suitable openings in the top and the heads 21 of the same make connections to the electric line by means of suitable mechanism received in the housing beneath the top 27, as will now be more fully described.

Referring now more particularly to Fig. 2, which shows the top of the stove in plan, slots are provided to receive the studs 11 which comprise at diametrically disposed points corresponding to the spacing of the studs openings 29 of sufficient size freely to pass such studs with a large allowance for clearance when the vessel is set down on the stove. When the flange 20 is present on the vessel and the top is elevated by the circular wall 25, the vessel will be roughly centered by the flange which embraces the wall 25, but in any instance the movement of superposition to cause the studs to enter the openings 29 may be a casual one and will require no exact aligning of the parts. From the openings 29 extend circumferentially, herein at their inner sides and in the same rotative direction, relatively narrow arc-shaped extensions 31, the breadth of which is substantially less than the radical dimension of heads 21 and only a little greater than the radial thickness of the shanks of the studs 11. When the studs have been inserted through the openings 29 and the vessel is turned circumferentially, the shanks will move into the extensions 31 of the slots and move therealong while the overhanging portions of heads 21 will move underneath the top beneath the margins of the extensions. When moved a substantial distance along the extensions 31, the heads 21 of the studs are adapted to make contact with opposite sides of the electric line, closing the electric circuit, and this is desirably done by means of switches which are closed by the movement of the studs to a position near the ends of the extensions.

The switches 33, herein illustrated in general outline only, are in the present instance normally open, snap-operated switches of a known commercial form and are therefore not described in detail herein. Suffice it to say that they include a movable arm 35 adapted to be engaged in conducting relationship by the end of head 21 as it moves in the latter part of its travel in the extensions 31, as seen in Fig. 3. The circuit, however, is still open in this position of the parts. Continued movement of the studs to the position of Fig. 4 causes pressure on the arm which throws the switch to the closed position by a snap action. On reversal of the travel of the stud when the vessel is to be removed from the stove, the switch snaps open while the arm 35 is still engaged by stud 21 to avoid any possibility of arcing.

The switches 33 are disposed beneath the overhang of the top 27, as seen in dotted lines in Fig. 2, remote from the extensions 31, the engaging arms 35 being disposed substantially tangent to a circle shown in dot and dash lines in Fig. 1 which is located radially outwardly of the extensions 31 but passes through the enlarged portions 29 of the slots.

I have referred to the slots comprising the enlarged portions 29 and the extensions 31 as being of restricted width and stated that the switch and its arm 35 are remote from the slots. By "restricted width" is meant that the slots are of such proportions as not to admit a finger or to admit it only to such an extent that it cannot be extended or bent to reach the switch or contact, and the word "remote" signifies that the switch and contact are so far from the slot 31 that they cannot be reached by a finger entered into or attempted to be entered into any portion of the slot. Thus, for example, a finger might be inserted in the enlarged portion 29 but it could not be moved into the extension 31 or from its position in the enlarged portion 29 be crooked far enough to reach the switch contact 35. The drawings annexed to this application illustrate an actual embodiment of the invention in which the width of the extensions 31 is about one-quarter of an inch. Fig. 2 shows that the circle tangent to switch arms 35, therein shown by the dot and dash line, is about the same distance from the outer periphery of the slots and that the overhang of heads 21 need be but slightly more (about a sixteenth) to permit them to engage the arms 35 and exert pressure on them to throw the switches to closed position. These studs 11 with their overhanging heads may thus be made stout and rugged, insusceptible to casual bending or loosening and adequately strong to exert pressure to operate the switches, and also the space beneath the head of the stud will be accessible to be wiped clean. The projecting fulness of a cleaning cloth held in the hand may be swept through this space without difficulty or particular care. On the other hand if the switch arms were very far distant from the slots the necessary overhang of the heads would be such that they would be structurally weak and practically impossible to keep clean in the routine of ordinary kitchen practice. In referring to the arms 35 as radially spaced from or remote from the extensions of the slots I do not, of course, mean a distance which would be a large multiple of the radial width of these slots or that of the stud shanks which move therein, since if the length of overhang were a fairly large multiple of the radial dimension of the stud shank the overhanging part would be either inherently weak or likely to impose too great a bending strain on the shank or both and, also, if the studs were of sufficiently low altitude to give desirable rigidity there would be defined a narrow crevice between the overhang and the bottom of the vessel difficult to clean. In general if altitude and overhang are of about the same order of size accessibility for cleaning is preserved. The arrangement shown, wherein the radial overhang is about equal to the altitude of the stud shank and not much more than the radial dimension of the stud shank, is a practical one which I recommend as preferable.

The remote location of the switches beneath the overhang of the top protects them from contact with other exterior objects than the prying finger and also protects the electrical connections of which they form a part from material spilled on the top of the stove. The bottom of the wall of the chamber which receives them is here shown as provided with drain openings 37 which may conveniently be at least in part directly opposite the openings 29 so that if any liquid is spilled on the top of the stove it falls through the slots in the top and will be at once discharged at the bottom. Herein the bottom wall of this chamber is provided with an annular groove or gutter 39 to direct any liquid falling thereon to such drainage openings 37.

I am aware that the invention may be embodied in other specific forms without departing from the spirit or essential attributes thereof, and I therefore desire the present embodiment to be considered in all respects as illustrative and not restrictive, as is in fact clear in several matters from the description itself. Reference is to be had to the appended claims to indicate those principles of the invention exemplified by the particular embodiment described and which I desire to secure by Letters Patent.

I claim:

1. In electrical cooking apparatus comprising a cooking vessel having a bottom from which projects downwardly a pair of contact-making studs having shanks and horizontally extending heads at the lower ends thereof and a support for the vessel having a top over which the bottom of the vessel may be superposed and having provision for connecting the same to a source of electric current and by the cooperation of which with the vessel when the latter is placed on the support the contents of the vessel are electrically heated, the support comprising a housing of smooth exterior contour to permit effectively continuous traverse of a cleaning cloth or the like over the same, the housing having a top on which the vessel may be superposed, the top having a pair of spaced upwardly opening slots of restricted width comprising relatively large portions freely to pass the heads of the studs downwardly therethrough and relatively narrow arc-shaped extensions of like radius opening from the large portions in the same rotative direction in which the shanks of the inserted studs may move circumferentially, and remotely positioned, normally open switches within the housing having provision for connecting the sides thereof more remote from the slots respectively to opposite sides of a source of electric current, the other sides of the switches comprising movable conducting arms interposed between the slots and the current-supply-connected sides to shield the latter and biassed to open position but susceptible of being moved therefrom under a substantial pressure exerted thereon to close the switches, the arms lying beneath the top adjacent the extensions and substantially tangent to a circle which passes through the relatively large portion of the slots and is radially spaced from the extensions to be first engaged by the heads of the studs advancing in the extensions and then moved thereby to move the switch arms to closed position.

2. In electrical cooking apparatus comprising a cooking vessel having a bottom from which projects downwardly a pair of contact-making studs having shanks and horizontally extending heads at the lower ends thereof and a support for the vessel having a top over which the bottom of the vessel may be superposed and having provision for connecting the same to a source of electric current and by the cooperation of which with the vessel when the latter is placed on the support the contents of the vessel are electrically heated, the support comprising a housing of smooth exterior contour to permit effectively continuous traverse of a cleaning cloth or the like over the same, the housing having a top on which the vessel may be superposed, the top having a pair of spaced upwardly opening slots of restricted width comprising relatively large portions freely to pass the heads of the studs downwardly therethrough and relatively narrow arc-shaped extensions of like radius opening from the large portions in the same rotative direction in which the shanks of the inserted studs may move circumferentially, a remotely positioned, normally open switch within the housing having provision for connecting the side of the switch more remote from the slots to one side of a source of electric current, the other side of the switch comprising a movable conducting arm interposed between the slots and the current-supply-connected side to shield the latter and biassed to open position but susceptible of being moved therefrom under a substantial pressure exerted thereon to close the switch, the arm lying beneath the top adjacent one extension and substantially tangent to a circle which passes through the relatively large portion of the slot the arm being radially spaced from the extension so that it is first engaged by the head of a stud advancing in the extension and then moved thereby to move the arm to closed position and a contact lying beneath the top adjacent the end of the extension of the other slot substantially tangent to said circle and radially spaced from said contact having provision for connecting it to the other side of the source of electric current.

ROBERT H. PARK.

REFERENCES CITED

The following references are of record in the file of this patent:

UNITED STATES PATENTS

| Number | Name | Date |
|---|---|---|
| 1,294,444 | Goetzelman | Feb. 18, 1919 |
| 1,903,883 | Schwander | Apr. 18, 1933 |
| 1,966,263 | Roller | July 10, 1934 |
| 2,233,485 | Park | Mar. 4, 1941 |
| 2,271,977 | Hjelmgren | Feb. 3, 1942 |
| 2,446,971 | Wittig | Aug. 10, 1948 |